Patented June 21, 1932

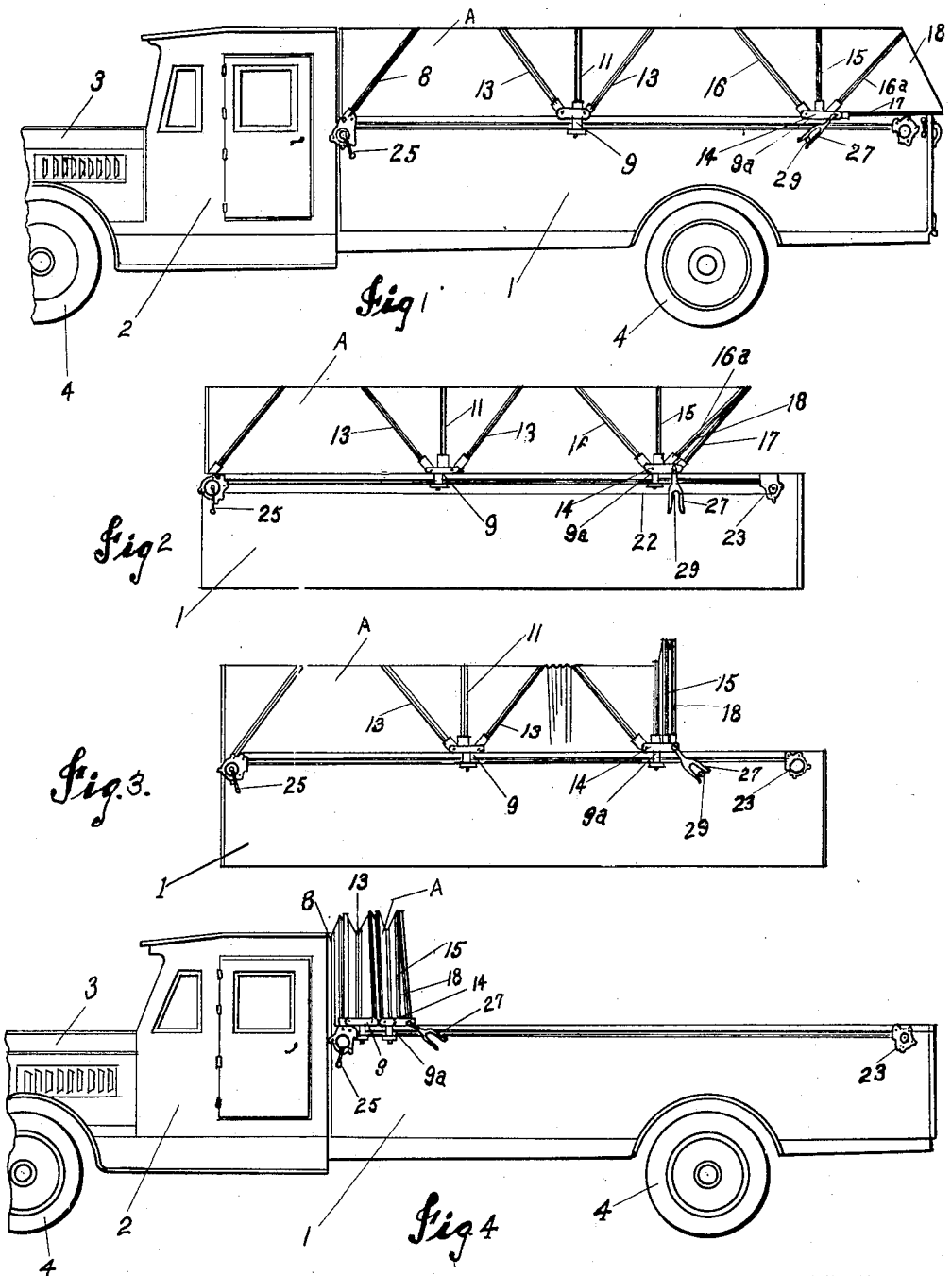

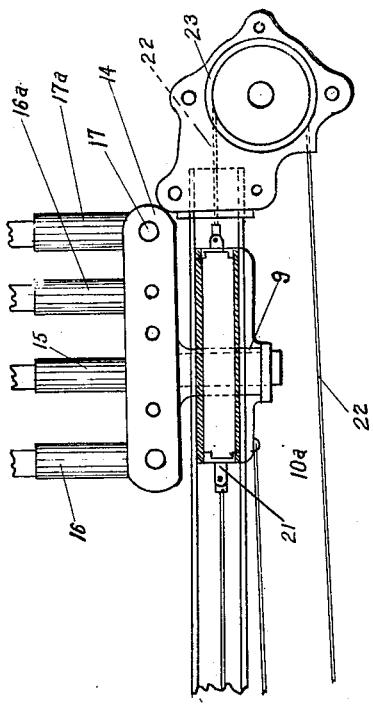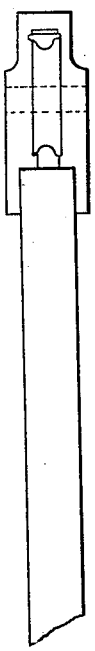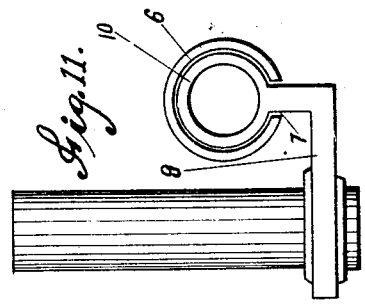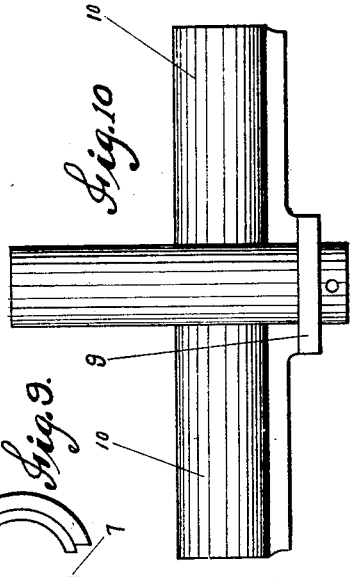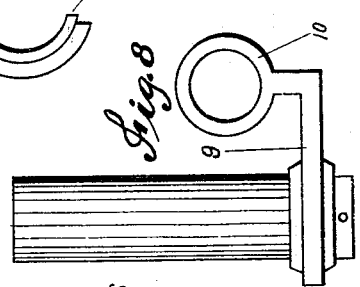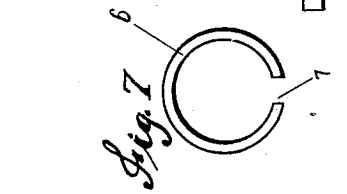

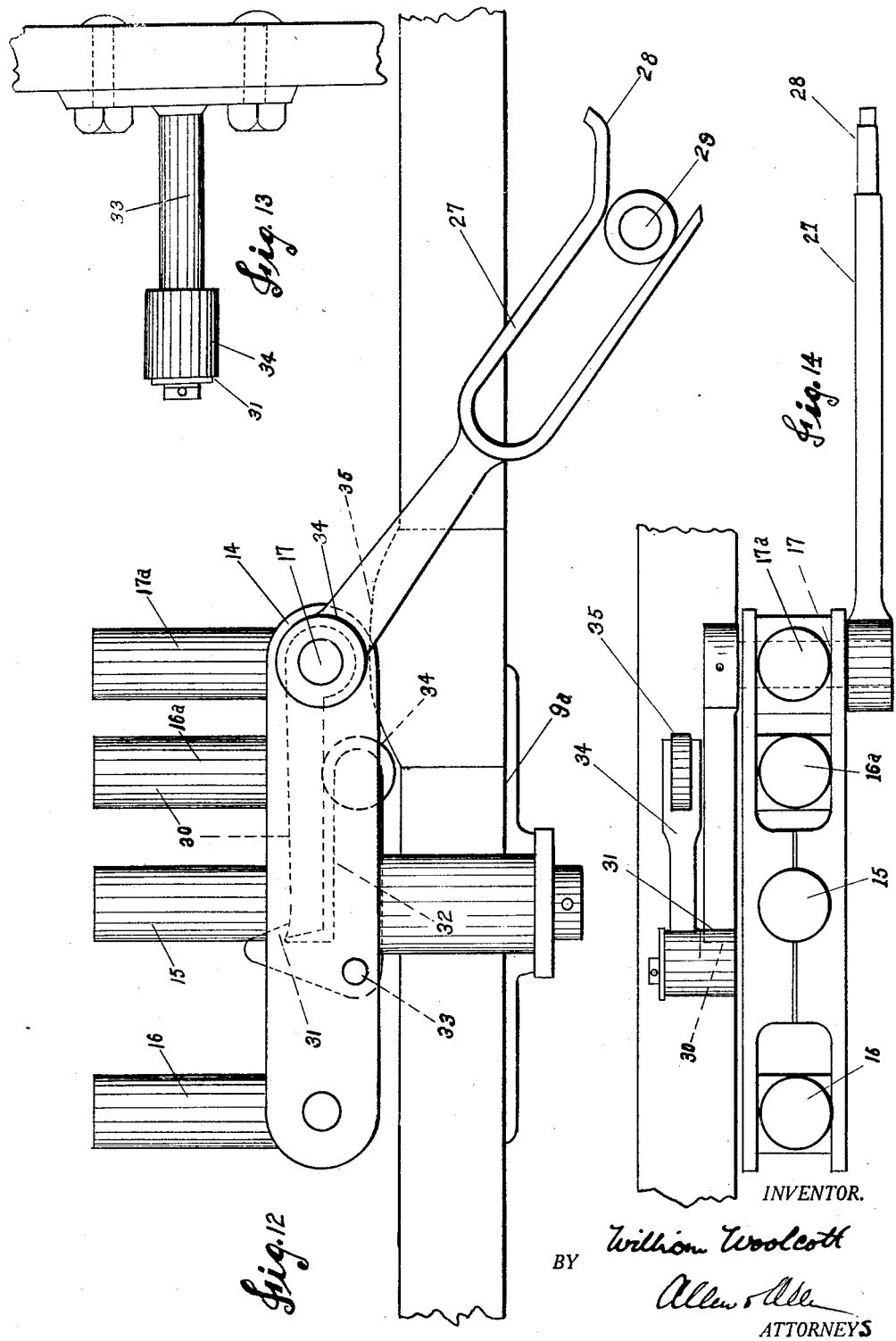

1,863,957

UNITED STATES PATENT OFFICE

WILLIAM WOOLCOTT, OF WINCHESTER, KENTUCKY, ASSIGNOR TO WOOLCOTT CONVERTIBLE TOP COMPANY, OF WINCHESTER, KENTUCKY, A CORPORATION OF DELAWARE

COVER FOR LAND VEHICLES

Application filed June 17, 1929. Serial No. 371,419.

My invention relates to collapsible covers for land vehicles, and particularly to covers for automotive trucks.

There has been rather a highly developed art in buggy and automobile and auto truck top construction, but to the best of my knowledge and belief, no one has heretofore made a collapsible cover for an auto truck which may be extended readily and easily, which forms a tight seal for the commodities transported by the truck, and which is provided with a locking device so arranged that in either extended or collapsed condition the parts will be rigidly supported and locked together.

It is toward the provision of an entirely practical, inexpensive and durable auto truck extension cover that my invention is directed, and among my specific objects is the provision of an extension cover formed of a series of bows mounted on shoes which slide along guides at the sides of the truck bed and which carry a drop curtain which at first moves with the cover and then automatically, when in fully extended position, drops down and locks, sealing the back end of the body. Another object is the provision of carrying shoes which rigidly support the collapsing bows so that the cover will not be likely to become distorted out of shape. Another object is the provision of a novel single and double sheave pulley assembly which may be actuated by a hand crank to quickly extend and collapse the cover.

The above and other objects to which reference will be made in the ensuing disclosure I accomplish by that certain combination and arrangement of parts of which I have shown a preferred modification.

Referring to the drawings:—

Figure 1 is a side elevation of an auto truck equipped with one of my novel collapsing covers.

Figure 2 is a side elevation of the body of a truck with one of my covers mounted thereon with the back drop partially elevated.

Figure 3 is a side elevation of the body of a truck with one of my covers mounted thereon in partially collapsed condition.

Figure 4 is a side elevation of a truck equipped with one of my covers with the cover completely collapsed.

Figure 5 is a side elevation of the double sheave pulley actuating mechanism with parts broken away and shown in section.

Figure 6 is a plan view of the pulley actuating mechanism with the pulley housing shown in section.

Figure 7 is an end elevation of the guide bar.

Figure 8 is an end elevation of the guide shoe.

Figure 9 is an end elevation of a mounting bracket for the guide bar.

Figure 10 is a side elevation of the guide shoe.

Figure 11 is an end elevation of the guide shoe in position within the guide bar.

Figure 12 is a side elevation on a scale enlarged relative to that of the other drawings, showing the automatic locking device.

Figure 13 is an end elevation of the trip roller.

Figure 14 is a plan view of the top locking device.

The auto truck in combination with which I have shown my cover may be of any desirable construction. The truck shown has the truck body 1, the cab 2, within which the driver sits, the hood 3 covering the engine, and the carrying wheels 4. Extending back from the cab to the rear of the truck body I mount on brackets 5, as shown in Figure 9, tubular guide bars 6 which, as noted, have a slot 7 extending longitudinally of the guide bars in the bottom thereof. The cover A, which may be of desired flexible material such as cotton duck or tarpaulin, is secured on a plurality of bows.

The particular bow construction illustrated consists of a front bow 8 which is pivoted in the body frame. The intermediate bows are carried on a shoe 9 which, as noted in Figure 8, has a tubular extension 10 which seats within the tubular guide bars as indicated in Figure 11. The shoes are therefore slidable throughout the length of the guide bars. Extending up from the intermediate bow assembly there is a fixed bow 11. In a supporting base 12 two bows, indicated at 13, are pivotally mounted, one on the right and one on the left.

The rear bow assembly is supported on a shoe 9a having a tubular extension or guide 10a which fits within the tubular guide bar 6. The shoe has fixedly mounted thereon a supporting base 14 which carries the fixedly mounted bow 15 and two pivotally mounted bows 16, 16a, one on the right and the other on the left. There is further journaled in the support 14, as indicated at 17, the bow 17a of the back drop curtain 18. The flexible material of the back drop is ordinarily of the same material as the main cover although this is not essential.

For extending and telescoping the bows I have provided at the front end of the truck body a double sheave pulley 19 having a flexible cable 20 attached to the periphery of the pulley on the inner side. The cable 20 passes through the tubular guide 10 of the intermediate bow assembly and is secured to the tubular guide 10a as indicated at 21, the connection being ordinarily such that slack in the cable may be taken up as desired. Connected with the end of the guide 10a, opposite that to which the cable 20 is secured, I secure another flexible cable 22 which passes over a pulley 23 mounted at the rear end of the truck body. After passing over the pulley 23 the cable extends forwardly and is attached to the other side of the double sheave pulley 19. I have shown a turn buckle adjustment in the cable 22 which will be utilized to take up slack and otherwise adjust the length of the cables for synchronous movement. The pulley 19 is mounted on an axle 24 which may be rotated as with a crank 25 in extending or telescoping the cover. The shaft extends across the truck body.

In order to avoid the strain which would otherwise occur on the top cover, I ordinarily connect the shoes 9 and 9a as with a flexible cable 26.

In order to automatically control the extension of the back drop, I provide, as best illustrated in Figures 12-14, a forked arm 27 which is fixedly mounted on the axle 17 of the bow 17a. The fork 27 has a cam surfaced extension 28 which engages a trip roller 29 preferably bolted to the truck body. Also fixedly mounted on the axle 17 of the bow 17a I have provided a latch 30 which engages a catch bar 31. The catch bar is pivotally mounted on a bell crank arm 32 which is pivotally mounted at 33. The long end of the bell crank carries a roller 34 which, during the extending movement of the cover, engages a cam track 35 and releases the catch bar from engaging the latch.

The operation of the locking device is as follows:—The operator of the truck turns the crank to extend the cover. As the pulley begins to turn the cable 22 pulls the shoe 9a along the guide bar toward the rear of the truck. After a certain distance has been reached the cable 26 becomes taut and the intermediate bow assembly is pulled back also. When the roller 34 starts to run up the track 35 the cam shaped extension 28 of the forked arm engages the roller 29 and the latch is momentarily lowered to prevent binding with the catch arm. The catch arm is then rocked, releasing the latch, and, as the roller 29 rides up between the channel of the fork, the axle of the bow 17a is rotated clockwise, as shown in Figure 12, causing the back drop curtain to be lowered. At the end of the extended movement of the cover the back drop is fully lowered covering anything which may be stored on the floor of the body. As long as the cables remain tight, nothing can dislodge the cover.

In moving the cover to the front the reverse of the extending operation occurs. First the back drop bow moves up and then as the latch engages the catch bar, the catch bar is rocked. There is no upward confinement of the roller on the crank arm 32; the catch bell crank arm is free to rock. The weight of the roller 34 then causes the catch to drop down over the latch which firmly locks the bow of the back drop curtain in position. The cover is then moved to the front where it collapses together as indicated in Figure 4.

The operation of extending the cover and of drawing it up from the position covering the load may be quickly and easily accomplished, and during all positions of the cover it is firmly held in position. While I have only shown one preferred modification of my invention, other modifications of the same idea will occur to others skilled in the art, but insofar as such modifications utilize the principle involved, I consider them within the scope of my invention.

Having thus described my invention, what I claim as new and desire to secure by Letters Patent, is:—

1. In combination with an auto truck having a body, a cover for said body having a back drop curtain, and means for locking said back drop curtain to said cover, said means automatically effective excepting during full extension of said cover, and means automatically effective during the extension of said cover for releasing said locking means, and for extending said back drop curtain following the release of said locking means.

2. In combination with an auto truck having a body, a flexible cover for said body, a bow assembly for supporting said cover, said bow assembly comprising slidable shoes one on each side of said body and having supports thereon, a fixed bow mounted on said supports, and pivoted bows also mounted on said supports, a back drop curtain, and one bow pivoted in a slidable shoe comprising a support for said curtain, and means operative during the extension of said cover to rotate said back drop bow to lower the same, said bow being provided with a mechanical lock to hold the same upright until substantially the complete extension of said cover.

3. In combination with an auto truck having a body, an extension cover for said body comprising a flexible cover, bows forming supports for said cover, supports for said bows at the sides of said body, and guide bars for said last named supports comprising tubular bars with slots at the bases of the bars, said cover having a back drop curtain, and means for mechanically lowering said back drop curtain during the extension of said cover comprising a member pivotally mounted on one of said bow supports, and a member mounted on said body to rock said member at a certain position in its movement and to thereby lower said back drop curtain, and a locking device for said back drop curtain with means for releasing the device coincident with the rocking of said member.

4. In combination with a truck body and an extensible and collapsible curtain therefor having a rear part slidable along said body, a drop curtain mounted on said rear part to be raised and lowered and having engaging members moving therewith as it is raised and lowered, a lock automatically engaging one engaging member as the curtain is raised, to hold the curtain up, and engaging elements on said body, one element disengaging said lock from the one engaging member, and the other element engaging the other engaging member of the curtain, to lower the curtain, in a final stage of extension of said cover, this other element engaging said other engaging member of the curtain, to raise the curtain, in the initial stage of collapse of the cover.

WILLIAM WOOLCOTT.